Feb. 25, 1964 J. E. HERMANSDORFER 3,122,693
CONTROL APPARATUS FOR THREE-PHASE MOTORS
Filed Feb. 8, 1962

INVENTOR.
JAMES E. HERMANSDORFER
BY
ATTORNEY

United States Patent Office 3,122,693
Patented Feb. 25, 1964

3,122,693
CONTROL APPARATUS FOR THREE-PHASE MOTORS
James E. Hermansdorfer, Charlottesville, Va., assignor to Sperry Rand Corporation, Great Neck, N.Y., a corporation of Delaware
Filed Feb. 8, 1962, Ser. No. 172,000
3 Claims. (Cl. 318—221)

This invention relates to control apparatus for three-phase induction motors and particularly to apparatus for starting and running three-phase induction motors from a single phase source of alternating current supply. The invention further includes means responsive to a transient condition for restoring starting conditions temporarily and then returning to running conditions upon resumption of normal operating conditions.

It has been found advisable, for example, in the field of gyroscopics, to utilize a three-phase induction motor rather than a single phase induction motor because of the improved operating characteristics of the three-phase motor although only a single phase source of alternating current is available. A three-phase induction motor may be started from a single phase source of A.C. supply in a manner similar to the starting of a single phase motor, i.e., by connected phase modifying devices such as capacitors in circuit with some but not all of the motor stator windings, but because of the different values of motor starting impedance and motor running impedance it is desirable to change the values of the phase modifying devices between the running and starting conditions.

When utilizing this arrangement, it has been found that transient surge conditions sometimes cause the motor control circuit to switch from a running condition to a starting condition but there is an insufficient current ratio to return the motor control circuit to a running condition. Therefore, the motor control circuit remains in a start configuration thereby drawing excessive current and overheating the motor. Further, when a relay is used to switch from the start to the run condition, for example as shown in U.S. Patent 2,593,987, issued April 22, 1952 to F. M. Courtney et al., entitled Three-Phase Motor Control. Apparatus, the relay when experiencing a transient surge tends to chatter, i.e., switch rapidly between the start and run configuration and back again.

It is an object of the present invention to provide improved means for starting and running a three-phase induction motor from a single phase source of alternating current supply.

It is an additional object of the present invention to provide automatic means for shifting from a starting to a running condition, although the current ratio through one of the motor connections is inadequate to accomplish this per se.

The above objects are accomplished by connecting a relay to be responsive to the rectified current from one of the conductors of a pair of conductors which connect to a single phase source of alternating current supply. The output terminal of the relay is connected to a resistor, a capacitor and a zener diode which are connected in parallel with respect to each other when the relay is in the start condition. During the start condition, the zener diode conducts thereby providing a low impedance path until the rectified starting voltage becomes lower than the zener diode voltage. This removes the low impedance shunt (zener diode) across the high impedance of the resistor in the output path of the relay thereby appreciably reducing the current through the relay which causes the relay to switch to the run condition.

Figure 1:
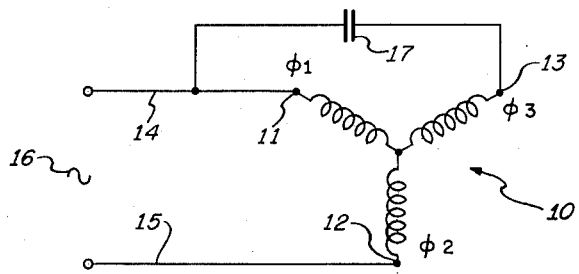
FIG. 1 is a wiring schematic of a three-phase induction motor connected to a single phase alternating current source.

Referring to FIG. 1, a three-phase induction motor 10 has three Y-connected stator windings terminating in motor terminals 11, 12 and 13. First and second conductors 14 and 15, respectively, are connected between the motor terminals 11 and 12 and a source of single phase alternating current supply 16. A capacitor 17 is connected between the motor terminal 13 and the conductor 14.

Figure 2:
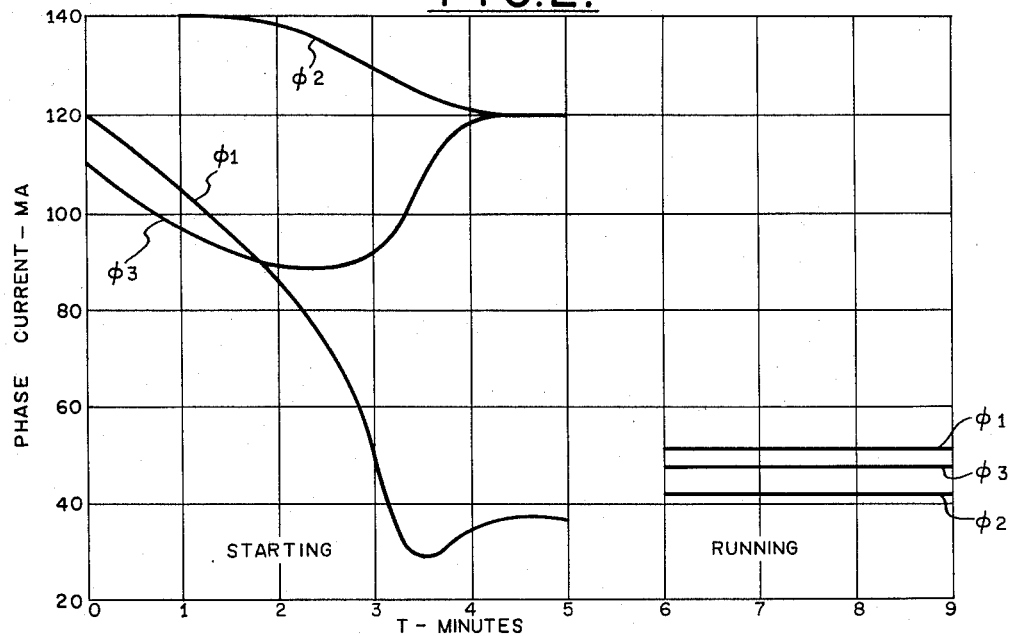
FIG. 2 is a graph of the magnitude of the currents in a three-phase motor as a function of time as the motor comes up to speed.

As shown in FIG. 2, when the motor 10 of FIG. 1 is started up the starting current associated with $\phi 1$ is initially high, for example 120 milliamps., and during the transition from start to run decays as a function of time until it reaches the running current of approximately 50 milliamps. The time interval required to do this for a particular gyroscopic induction motor is approximately six minutes. Because of the different values of motor starting impedance and motor running impedance, it is desirable to have one value of capacitance during the starting condition and another value of capacitance during the running condition of the motor 10.

Figure 3:
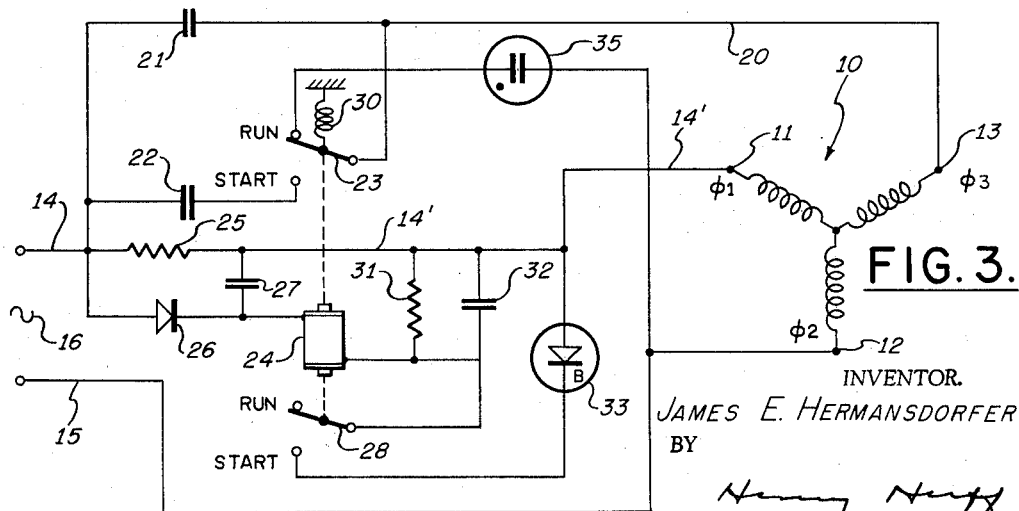
FIG. 3 is a schematic wiring diagram of a three-phase induction motor connected to a single phase alternating current source showing the motor control circuit of the present invention.

Referring now to FIG. 3, a three-phase induction motor 10 has its motor terminals 11 and 12 connected by means of conductors 14 and 15, respectively, to a single phase alternating current source 16. The motor terminal 13 is connected by means of a conductor 20 through a capacitor 21 to the conductor 14. The capacitor 21 provides the proper phase modification during the running mode of operation of the motor 10. To provide the proper phase modification for starting the motor 10, a capacitor 22 is adapted to be connected in parallel with the capacitor 21 by means of a switch 23 of a relay 24 during the starting mode in a manner to be explained.

A conventional single coil relay such as 24 requires a 3:1 ratio in its coil current between its pick-up and drop-out values, i.e., to energize and to de-energize. The graph of FIG. 2 shows that the variation in either of $\phi 2$ or $\phi 3$ currents is not sufficient to energize and de-energize the relay 24. Therefore, only $\phi 1$ current can be used for this purpose.

The point at which the transition from start to run, i.e., energized to de-energized condition of the relay 24, occurs can be selected at one of three points on the $\phi$ curve:

(1) at a value greater than $\phi 1$ run current,
(2) at a value equal to $\phi 1$ run current, or
(3) at a value less than $\phi 1$ run current.

If condition 2 is selected, i.e., at a value equal to $\phi 1$ run current, the relay 24 cannot distinguish between start and run values of $\phi 1$ current. Therefore, this value is unacceptable. If condition 3 is selected, i.e., at a value less than $\phi 1$ run current, a transient surge sufficiently large to operate the relay 24 after the motor 10 is up to speed may cause the relay 24 to remain in the start, i.e., energized, mode. This is an unstable condition since the relay 24 will switch from a low $\phi 1$ current to a higher value causing the relay 24 to chatter and causing the motor 10 to overheat due to the high current conducted thereto. Thus, for positive relay operation, it is necessary to operate at condition 1, i.e., at a value greater than the $\phi 1$ run current. However, the difference between the running current, which is shown in FIG. 2 as approximately 50 milliamps., and the highest value of the surge current, approximately 120 milliamps., does not provide the necessary 3:1 current ratio to satisfy the pull-in to drop-out ratio of the relay 24.

The circuit to be described forthwith provides the necessary 3:1 current ratio across the relay 24 thereby permitting positive operation although the current through ϕ1 has a ratio from start to run of less than 3:1. A resistor 25 has one terminal connected to the source 16 by the conductor 14 while its other terminal is connected by the conductor 14' to the motor terminal 11. The resistor 25 provides a voltage drop proportional to the current through the conductor 14. A rectifier 26 has its input terminal connected to the source 16 while its output terminal is connected to an input terminal of the relay 24. A filtering capacitor 27 is connected to the output terminal of the rectifier 26 and to the resistor 25.

The relay 24 includes two ganged switches 23 and 28. The switches 23 and 28 are normally held in a run position by means of a spring 30. The output terminal of the relay 24 is connected to one terminal of a resistor 31 having a relatively high resistance which has its other terminal connected to the conductor 14' between the resistor 25 and the motor terminal 11. Similarly, a capacitor 32 has one terminal connected to the output terminal of the relay 24 and its other terminal connected to the conductor 14' between the resistor 25 and the motor terminal 11. The output terminal of the relay 24 is further connected to its switch 28 in order that in the start mode it is connected through the switch 28 to one terminal of a zener diode 33 which has its other terminal connected to the conductor 14' between the resistor 25 and the motor terminal 11.

In operation, when the power is turned on, the high initial surge current through ϕ1 develops a voltage proportional thereto across the resistor 25. The current is rectified by the rectifier 26 and stored by the filter capacitor 27. The rectified and filtered current is applied to the relay 24. The initial current through the relay 24 energizes it thereby moving the switches 23 and 28 to their start positions. The current initially flows through the relay 24 because the capacitor 32 is so designed that the time required to charge the capacitor 32 is much greater than the time required to energize the relay 24.

Energization of the relay 24 places the capacitors 21 and 22 in parallel by means of the switch 23 thereby providing the proper phase modification for starting the motor 10. By means of the switch 28, the zener diode 33 is connected in series with the coil of the relay 24. This places the resistor 31, the capacitor 32 and the zener diode 33 in parallel with respect to each other. The capacitor 32 charges until it reaches the zener voltage of the zener diode 33 at which time the zener diode 33 conducts thereby providing a low impedance path for the current through the relay 24 and assuming control of the relay 24. The voltage drop across the capacitor 32 and the resistor 31 is limited by the zener voltage of the zener diode 33. The resistor 31 has a relatively high resistance value in order that very little current flows therethrough.

As the motor 10 comes up to speed, the current through the resistor 25 decreases in accordance with the graph of FIG. 2. Eventually the rectified and filtered voltage across the capacitor 27 decreases to a value such that the zener diode 33 stops conducting. With the capacitor 32 charged, the current through the relay 24 must then flow through the high resistance of the resistor 31 thereby causing the current through the relay 24 to drop suddenly, i.e., considerably below the 3:1 ratio required, and the relay 24 becomes de-energized. By the action of the spring 30, the switches 23 and 28 are placed in their run positions. The switch 23 disconnects the capacitor 22 and connects a lamp 35 between the conductors 14 and 15 to provide a visual indication that the motor 10 is in the run condition. In the run position, the switch 28 disconnects the zener diode 33.

In the event there is a line voltage surge transient which is great enough for the capacitor 32 to effectively short out the resistor 31, the relay 24 will again become energized and place the motor control circuit in the start mode. This again places the zener diode 33 in control of the relay 24 and, when the surge transient decays, the zener diode 33 will stop conducting and because of the high resistance of the resistor 31, the relay 24 will become de-energized thereby placing the motor control circuit in the run mode again.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In an apparatus for starting and running from a single phase source of alternating electric current supply a three-phase alternating current motor having first, second and third motor terminals,
   (1) first and second conductors for connecting said first and second motor terminals to said single phase supply source,
   (2) first phase modifying means connected to said first conductor and said third motor terminal,
   (3) second phase modifying means adapted to be connected in parallel with respect to said first phase modifying means upon starting said motor,
   (4) impedance means having a first terminal connected to said single phase supply source and a second terminal connected to said first motor terminal by means of said first conductor,
   (5) switch means having start and run positions whereby in said start position said second phase modifying means is in parallel with said first phase modifying means and in said run position said second phase modifying means is disconnected,
   (6) and means connected to said switch means and between said impedance means and said first motor terminal for positioning said switch means in said start position during starting and then placing said switch means in said run position during running although the current ratio through said first conductor is inadequate in itself to control said switch means.

2. In an apparatus for starting and running from a single phase source of alternating electric current supply a three-phase alternating current motor having first, second and third motor terminals,
   (1) first and second conductors for connecting said first and second motor terminals to said single phase supply source,
   (2) first phase modifying means connected to said first conductor and said third motor terminal,
   (3) second phase modifying means adapted to be connected in parallel with respect to said first phase modifying means upon starting said motor,
   (4) first impedance means having a first terminal connected to said single phase supply source and a second terminal connected to said first motor terminal by means of said first conductor,
   (5) first current responsive switch means having input and output terminals and further including first and second ganged switches each having start and run positions, said second phase modifying means being connected to said first ganged switch whereby in said start position said second phase modifying means is in parallel with said first phase modifying means and in said run position said second phase modifying means is disconnected,
   (6) rectifying means having an input terminal connected to the first terminal of said impedance means and an output terminal connected to said first switch means input terminal, (7) current storage means and high resistance means connected to said first switch means output terminal and to the second terminal of said first impedance means, said current storage means and said high resistance means being in parallel with respect to each other, (8) and second switch means connected to the second terminal of said first impedance means and to said second ganged switch, said second ganged switch being connected to said first switch means output terminal whereby in said start position said second switch means is in parallel with said current storage means and said high resistance means and in said run position said second switch means is disconnected.

3. In an apparatus for starting and running from a single phase source of alternating electric current supply a three-phase alternating current motor having first, second and third motor terminals, (1) first and second conductors for connecting said first and second motor terminals to said single phase supply source, (2) a first capacitor connected to said first conductor and said third motor terminal, (3) a second capacitor adapted to be connected in parallel with respect to said first capacitor upon starting said motor, (4) a first resistor having a first terminal connected to said single phase supply source and a second terminal connected to said first motor terminal by means of said first conductor, (5) a relay having input and output terminals and further including first and second ganged switches having start and run positions, said second capacitor being connected to said first switch whereby in said start position said second capacitor is in parallel with said first capacitor and in said run position said second capacitor is disconnected, (6) a rectifier having an input terminal connected to the first terminal of said resistor and an output terminal connected to said relay input terminal, (7) a third capacitor and a second resistor connected to said relay output terminal and to the second terminal of said first resistor and in parallel with respect to each other, (8) and a zener diode conneced to the second terminal of said first resistor and to said second switch, said second switch being connected to said relay output terminal whereby in said start position said zener diode is in parallel with said third capacitor and said second resistor and in said run position said zener diode is disconnected.

References Cited in the file of this patent
UNITED STATES PATENTS
2,832,925    Koll _____ Apr. 29, 1958
FOREIGN PATENTS
170,780    Germany _____ Mar. 25, 1952
OTHER REFERENCES
McAuley, G.: Phase Conversion, Electrical Review, page 16, July 7, 1944.